United States Patent [19]

Hagihara

[11] 4,296,307
[45] Oct. 20, 1981

[54] MANUFACTURING METHOD OF THE VALVE DISK OF SPRING LOADED SAFETY VALVES

[75] Inventor: Noboru Hagihara, Nishinomiya, Japan

[73] Assignee: TOA Valve Co. Ltd., Toribayashi Amagasaki, Japan

[21] Appl. No.: 82,909

[22] Filed: Oct. 9, 1979

[30] Foreign Application Priority Data

Oct. 9, 1978 [JP] Japan ............................. 53-124440

[51] Int. Cl.³ ............................................. B23K 15/00
[52] U.S. Cl. ............................. 219/121 ED; 137/469; 251/356
[58] Field of Search ................. 219/121 EC, 121 ED, 219/121 EB, 121 EM, 121 LC, 121 LD, 121 LM, 137 R; 251/356, 334; 137/469, 470, 471, 472, 473, 474

[56] References Cited

U.S. PATENT DOCUMENTS

| | | | |
|---|---|---|---|
| 3,219,311 | 11/1965 | Siver | 251/334 X |
| 3,433,250 | 3/1969 | Hagihara | 251/334 X |
| 3,454,740 | 7/1969 | Foulquier et al. | 219/121 EC |

FOREIGN PATENT DOCUMENTS 48-20495  6/1973  Japan ........................... 219/121 EM

OTHER PUBLICATIONS

Lyman et al., "Electron Beam Welding", *Metals Handbook*, 8th Edition, vol. 6, Aug. 1971, pp. 522, 535, 555, 563.

*Primary Examiner*—C. L. Albritton
*Attorney, Agent, or Firm*—Armstrong, Nikaido, Marmelstein & Kubovcik

[57] ABSTRACT

A manufacturing method of the valve disk of spring loaded safety valves comprising, making its bottom portion as the pressure receiving surface, a cup-shaped center portion having an annular protrusion slightly inwardly from the peripheral edge of its bottom and a cylinder provided with an inwardly extending annular flange (valve lip) formed through bending its lower end, which is formed by continuous metal fibers, and contacting those two parts. More particularly, securing tight contact between the stage portions provided at least with one step beforehand around the outer periphery of said center portion and the inner periphery of said cylinder respectively when both are set in and, at the same time, maintaining an extremely narrow and uniform space between said annular protrusion and annular flange. Welding the contacting surfaces of said center portion and cylinder at a stretch by electronic beam.

4 Claims, 5 Drawing Figures

MANUFACTURING METHOD OF THE VALVE DISK OF SPRING LOADED SAFETY VALVES

DESCRIPTION

Generally speaking, the present invention relates to a manufacturing method of a valve disk of a spring loaded safety valve. Such valves are commonly used, for example, for eliminating excess pressure in steam boilers. More particularly, the present invention relates to a manufacturing method of a thermal face type valve disk of a spring loaded safety valve wherein, making the bottom-end portion of its surrounding valve lip and an annular protrusion facing the said annular flange are annularly provided on the inner side near the peripheral edge of the bottom surface.

In general, a safety valve, unlike other stop valves, is closed when the carefully finished surface of both the valve disk and valve seat are brought into contact with each other. The disk is pressed against the seat solely by the difference in the loading force between the pressure exerted by the spring and the pressure of the inner fluid. Therefore it has technically been extremely difficult to obtain such a perfect contact between the disk and seat so that leakage is still prevented even when the disk is about to pop up due to the increasing inner pressure, namely, when only a very low pressure difference is available for effecting closure. The condition becomes far more serious, as the inner pressure further increases. Should the slightest leakage be initiated between contacting surfaces of the disk and seat, the rapid outflow of steam erodes the contacting surfaces at the leaking portion and thereby causes a point of permanent leakage. At the same time, the sudden expansion of the fluid flowing out of the leaking portion produces a marked temperature drop in the neighbourhood of the portion further causing local contraction of the disk and of the seat, whereby the leak orifice inevitably becomes larger in size rapidly giving rise to a pronounced leakage.

In order to overcome such disadvantages a safety valve has already been proposed, in which, as a principal feature, the bottom surface of a valve disk is provided with annular flange formed as thin as possible and having a surface for contact with a valve seat so that a satisfactory thermal transference may be insured while the local cooling effect attributable to leaking steam may be prevented from exerting objectionable influence. However, according to such a conventional safety valve having this type of structure, the flange portion and the contacting surface at the thin annular edge portion thereof cannot be provided with strength sufficient to withstand a large impact shock which is created when the valve is closed or when the spring pressure is applied thereon upon a marked reduction of the internal pressure. Accordingly, incidents such as damage and deformation in the contacting surfaces of the valve disk and seat are frequently observed to take place.

In order to eliminate aforesaid drawbacks, the inventor of the present application earlier developed a valve disk wherein the bottom surface of the disk is provided with an annular protrusion slightly inward from the peripheral edge and an inwardly extending annular flange (or valve lip) along the peripheral edge of the bottom. The upper surface of the flange is kept in contact with the end surface of the protrusion. An annular space is formed between the flange and the protrusion. The under surface of the flange serves as a contacting surface for contact with the valve seat. This is disclosed in U.S. Pat. No. 3,433,250 and Japanese Pat. No. 46-19893.

Furthermore, in view of the fact that the practical processing of said valve disk would involve many technical difficulties, the present inventor, after further studies, finally developed novel technology wherein, in order to easily manufacture a similarly-shaped valve disk to that aforementioned, the valve disk is arranged consisting of two parts, i.e. a center portion and a cylinder made of continuous metal fibers. An annular protrusion is provided slightly inward from peripheral edge of the bottom of said center portion, the lower-end portion of said cylinder is bent inwardly using it as an annular flange (or valve lip) then, after fitting said cylinder with said center portion, the contacting surfaces of these two parts are welded by electronic beam along the contacting direction at a stretch. A patent has been obtained on said later invention in Japan (Japanese Pat. No. 48-20495).

The valve disk thus manufactured by said technical processes according to the beforesaid two inventions theoretically performs extremely satisfactorily. In particular, the flexibility of its flange (valve lip) has been improved remarkably so that the performance of standing on tiptoe of the valve disk immediately before the valve opens can effectively be maintained. This leads to an increase in the pressure on the contacting surface with the valve seat. Thus, more reliable sealing effects just before the so-called popping up is ensured. At the same time, it has sufficient strength to withstand a large impact shock at the time of contacting with the seat after the so-called popping up. This makes permanent deformation of the flange more difficult to take place. However, in the latter invention where welding of the center portion and cylinder provided with the said lip is engineered by electronic beam, as a matter of practice, a technical problem occurs in that the said cylinder gets twisted due to heat shrinkage and/or heat distortion seen at the time of welding. Because, of this, the space between the said valve lip and the said protrusion becomes partially uneven. This tends to obstruct the standing action of the valve disk as has been observed.

One of the principal objects of the present invention in manufacturing a valve disk of safety valves consisting of an aforesaid center portion and a cylinder provided with annular flange (valve lip) is, in order to overcome aforesaid technical drawbacks, to provide a novel safety valve capable of evading heat effects upon the said flange, in particular absorbing heat distortion and/or heat shrinkage generated on the cylinder at the time of welding of these two parts by electronic beam by providing stage portions where the center portion and cylinder contact each other.

Another object is, while keeping a uniform space between the annular flange and the protrusion, to provide a manufacturing method of a novel valve disk of safety valves capable of accurately maintaining the predetermined pressure of the valves along with a smooth functioning of the standing action of the valve disk.

Further, a principal object of the present invention is to turn out a valve disk of safety valves which exhibit excellent effects as a valve disk for safety valves for use of extra critical pressure.

Other objects and advantages of the present invention will become apparent from the following detailed description.

To facilitate the present invention being readily understood, a description is given below along the accompanying drawings, in which, FIG. 1 is a view in cross section of center portion showing structural relationship between a valve disk and a valve seat manufactured in accordance with the present invention.

FIG. 2 shows an enlarged view in cross section of the valve disk shown in FIG. 1.

FIG. 3 exhibits an enlarged view in cross section of important parts showing a manufacturing process of the valve disk illustrated in FIG. 2.

Figure 1:
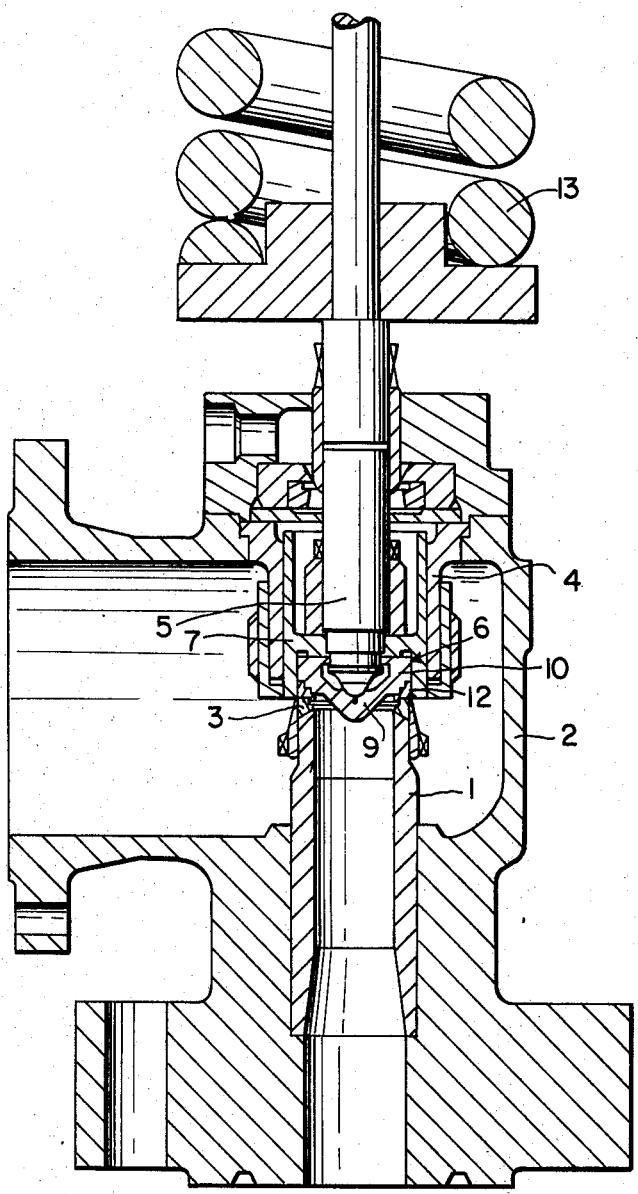
Figure 2:
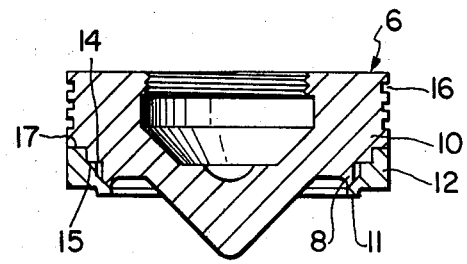

In FIGS. 1 and 2, a valve seat (1) is mounted in a casing (2). An annular valve seat surface (3) is formed on the upper-end surface of the valve seat (1). (4) shows a cylindrical valve disk guide, and (5) shows a valve stem. A valve disk (6) is fitted in a disk holder (7) and movable vertically along said valve disk guide (4) jointly with said disk holder (7) as one body. Valve disk (6) is provided with an annular protrusion (8) slightly radially inward from the peripheral edge of its bottom, and is made of a cup-shaped center portion (10) that makes its bottom portion a pressure receiving surface (9) fitted circularly to a cylinder (12) provided with inwardly extending annular flange (valve lip) (11) formed through bending its lower end portion about 90°, formed of continuous metal fibers. The bottom surface of said valve disk (6) is usually pressed against the valve seat surface (3) by a spring (13) provided on the upper side of the valve stem (5).

Figure 3:
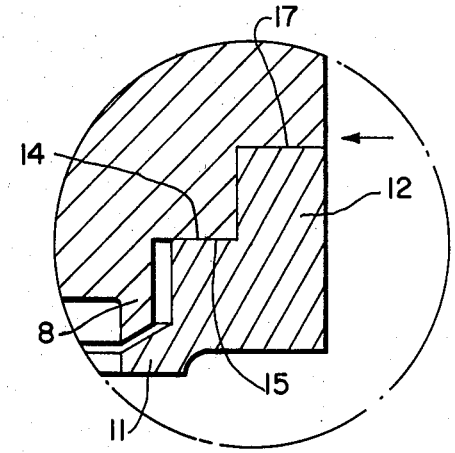

The present invention relates to a manufacturing method of a valve disk (6) comprising the two parts, i.e. the center portion (10) and cylinder (12) provided with the valve lip (11). This invention will become apparent from FIGS. 2 and 3. The manufacturing method comprises forming stage portions (14) (15) on the outer periphery of said center portion (10) and on the inner periphery of said cylinder (12) respectively, contacting said stage portions (14) and (15) while maintaining a uniform space having a distance of approximately 0.02 mm between said annular protrusion and valve lip (11) through fitting the cylinder (12) with the center portion (10), welding by electronic beam at a stretch along the surface contacting direction of the center portion (10) and cylinder (12) as shown by an arrow head line in FIGS. 2 and 3 and giving finishing touches on the outer part of the welded portion and the contacting surface of the valve lip (11) and is characterized in keeping a uniform space as originally established between said valve lip (11) and annular protrusion (8) without being affected by heat distortion and/or heat shrinkage generated at the time that the cylinder (12) with valve lip (11) and center portion (10) are welded. This is accomplished by confining said heat shrinkage and/or heat distortion to said contacting stage portions (14) (15). Numeral (16) shows a labyrinth groove while (17) is a recess formed on the outer periphery at the lower part of the center portion (10) to hold the cylinder (12).

Figure 4:
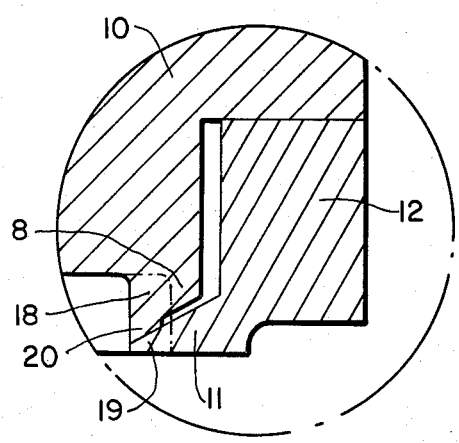
FIG. 4 shows an enlarged view in cross section of important parts showing a manufacturing process in another embodiment of this invention different from the embodiment shown in FIG. 3.

In addition to or in place of the steps of the inventive method above, the following can also be used to produce a valve disk as shown in FIG. 4. Extra inwardly extending portions (18) (19) are provided before assembly on the protrusion (8) and the valve lip (11). An additionally annular convex portion (20) is annularly provided either downwardly on the inner peripheral edge of the extending portion (18) of protrusion (8) as shown in FIG. 4 or upwardly on the inner peripheral edge of the extending portion (19) of valve lip (11). When the center portion (10) is fitted with the cylinder (12), the annular convex portion (20) is arranged contacting the upper surface of the extending portion (19) of the valve lip (11) or the lower surface of the extending portion (18) of the protrusion (8). This takes up the heat distortion or heat shrinkage generating on the cylinder (12) at the time of welding by said electronic beam. The annular convex portion (20) after correcting inside distortion by heat treatment following the completion of said welding is eliminated. That is, the extending portions (18) (19) of the protrusion (8) and the valve lip (11) are removed along the dotted-broken line shown in FIG. 4 when the disk undergoes a finishing process.

Figure 5:
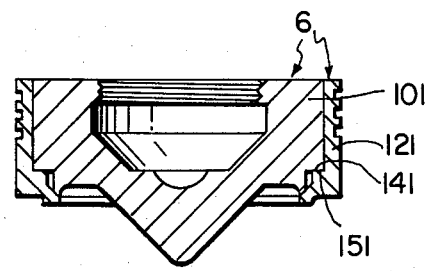
FIG. 5 is an enlarged view in cross section of center part showing a deformation example of the valve disk according to this invention shown in FIGS. 1-4.

The valve disk shown in FIGS. 1-4 embodies the one wherein a recess portion (17) is provided on the lower peripheral surface of the center portion (10) to put the cylinder (12) into said center portion (10). After putting the cylinder (12) which is comparatively short in length into the recess (17), the contacting surface thereof is welded by electronic beam in a radial direction. Another embodiment according to this invention is illustrated in FIG. 5. A comparatively long cylinder (121) provided with valve lip is fitted over the full length of a center portion (101) provided with stage portions (141) and (151) that contact each other on the contacting surface thereof. These are welded by electronic beam along the vertical contacting surfaces appearing on the upper-end surface as shown by arrow head line in FIG. 5.

As detailed above, the present invention is characterized by providing at least one stage portion on both a center portion and cylinder contacting each other in order to catch heat distortion and/or heat shrinkage generated on the cylinder with the valve lip at the time of welding of these two parts by electronic beam so that none of such heat affects the valve lip. This ensures a uniform space originally established to be maintained between the valve lip and protrusion. Hence, the valve disk manufactured in accordance with the present invention enables a smooth balancing of pushing-up strength and spring load, viz. the standing action of the valve disk just before the valve opens by means of internal pressure. Additionally leakage is prevented by maintaining a correct valve pressure keeping a line contact between the valve disk and valve seat and safety valves for use of extra critical pressure having remarkably excellent performance are provided.

In addition, the present invention, due to its manufacturing process being comparatively simple, is characterized in producing the valve disk of safety valves that exhibits aforesaid effects readily and inexpensively.

Although the present invention has been described above with respect to typical embodiments, the present invention does not limit the invention only to the before described embodiments but the invention may also reside in all of substitutes, equivalents and alterations without departing from the principle of the invention as set forth in the claims stated below.

What is claimed is:

1. A method of manufacturing a valve disk for a spring-loaded safety valve, said valve disk comprising a cup-shaped center portion and a cylinder portion annularly fitted thereto, said center portion having a central longitudinal axis, a lower end, an outer periphery, a stepped annular recess about said lower end, and an annular protrusion axially-extending from said lower end and spaced radially inward of said stepped recess, said cylinder portion having an upper end, a lower end, an inner periphery and a radially inward extending annular valve-lip flange, said annular flange being made of continuous metal fibers and being formed by bending said lower end radially inwards, said upper end of said cylinder portion being fitted in said stepped recess, thereby forming a first contacting surface in a radial plane, said method comprising forming at least one annular stage portion on said center portion radially inwardly of said stepped recess and radially outwardly of said annular protrusion;

forming at least one matching annular stage portion on said inner periphery of said cylinder portion;

fitting said cylinder portion to said center portion contacting said at least one annular stage portion to said at least one matching annular stage portion thereby forming a second contacting surface while establishing a uniform spacing between said annular protrusion and said annular flange; and welding said cylinder portion to said centering portion by electronic beam at said first contacting surface whereby said second contacting surface takes up any heat distortion generated by the welding so that said uniform spacing is maintained constant.

2. A method of manufacturing a valve disk for a spring-loaded safety valve, said valve disk comprising a cup-shaped center portion and a cylinder portion annularly fitted thereto, said center portion having a central longitudinal axis, a lower end, an outer periphery, and an annular protrusion axially-extending from said lower end and spaced radially inward of said outer periphery, said cylinder portion having an upper end, a lower end, an inner periphery and a radially inward extending annular valve-lip flange, said annular flange being made of continuous metal fibers and being formed by bending said lower end radially inwards, said inner periphery of said cylinder portion surrounding said outer periphery of said center portion thereby forming a concentric cylindrical first contacting surface, said method comprising forming at least one annular stage portion on said center portion radially inwardly of said outer periphery and radially outwardly of said annular protrusion;

forming at least one matching annular stage portion on said inner periphery of said cylinder portion;

fitting said cylinder portion to said center portion contacting said at least one annular stage portion to said at least one matching annular stage portion thereby forming a second contacting surface while establishing a uniform spacing between said annular protrusion and said annular flange; and welding said cylinder portion to said centering portion by electronic beam at said first contacting surface whereby said second contacting surface takes up any heat distortion generated by the welding so that said uniform spacing is maintained constant.

3. A method of manufacturing a valve disk for a spring-loaded safety valve, said valve disk comprising a cup-shaped center portion and a cylinder portion annularly fitted thereto, said center portion having a central longitudinal axis, a lower end, an outer periphery, a stepped annular recess about said lower end, and an annular protrusion axially-extending from said lower end and spaced radially inward of said stepped recess, said cylinder portion having an upper end, a lower end, an inner periphery and a radially inward extending annular valve-lip flange, said annular flange being made of continuous metal fibers and being formed by bending said lower end radially inwards, said upper end of said cylinder portion being fitted in said stepped recess, thereby forming a first contacting surface in a radial plane, said method comprising forming at least one annular stage portion on said center portion radially inwardly of said stepped recess and radially outwardly of said annular protrusion, said annular protrusion having a spur extending in an axial direction;

forming at least one matching annular stage portion on said inner periphery of said cylinder portion;

fitting said cylinder portion to said center portion contacting said at least one annular stage portion to said at least one matching annular stage portion thereby forming a second contacting surface while abutting said spur against said annular flange and establishing a uniform spacing between said annular protrusion and said annular flange;

welding said cylinder portion to said centering portion by electronic beam at said first contacting surface whereby said second contacting surface takes up any heat distortion generated by the welding so that said uniform spacing is maintained constant; and removing said spur and the portion of said annular flange abutting it so as to release said annular flange from said annular protrusion thereby freeing said uniform spacing.

4. A method of manufacturing a valve disk for a spring-loaded safety valve, said valve disk comprising a cup-shaped center portion and a cylinder portion annularly fitted thereto, said center portion having a central longitudinal axis, a lower end, an outer periphery and an annular protrusion axially-extending from said lower end and spaced radially inward of said outer periphery, said cylinder portion having an upper end, a lower end, an inner periphery and a radially inward extending annular valve-lip flange, said annular flange being made of continuous metal fibers and being formed by bending said lower end radially inwards, said inner periphery of said cylinder portion surrounding said outer periphery of said center portion thereby forming a concentric cylindrical first contacting surface, said method comprising forming at least one annular stage portion on said center portion radially inwardly of said outer periphery and radially outwardly of said annular protrusion, said annular protrusion having a spur extending in an axial direction;

forming at least one matching annular stage portion on said inner periphery of said cylinder portion;

fitting said cylinder portion to said center portion contacting said at least one annular stage portion to said at least one matching annular stage portion thereby forming a second contacting surface while abutting said spur against said annular flange and establishing a uniform spacing between said annular protrusion and said annular flange;

welding said cylinder portion to said centering portion by electronic beam at said first contacting surface whereby said second contacting surface takes up any heat distortion generated by the welding so that said uniform spacing is maintained constant; and removing said spur and the portion of said annular flange abutting it so as to release said annular flange from said annular protrusion thereby freeing said uniform spacing.

* * * * *